United States Patent Office 3,359,316
Patented Dec. 19, 1967

3,359,316
N-NITROSO-N-PHENYLALKYL-AMINES
John H. Biel, Milwaukee, Wis., assignor, by mesne assignments, to Colgate-Palmolive Company, a corporation of Delaware
No Drawing. Filed Feb. 24, 1958, Ser. No. 716,876
2 Claims. (Cl. 260—570.8)

This invention relates to hydrazine derivatives. More particularly, this invention is concerned with phenylalkylhydrazines and the use of these compounds as psychotherapeutic agents. The invention is also concerned with novel pharmaceutical compositions containing a phenylalkylhydrazine.

This application is a continuation-in-part of my copending application Ser. No. 605,724, filed Aug. 23, 1956, and now abandoned.

It has been discovered, according to the present invention, that phenylalkylhydrazines have psychotherapeutic activity. The phenylalkylhydrazines which possess such activity, and are thus psychotherapeutic agents, have the formula:

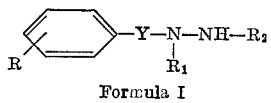

Formula I wherein R is hydrogen of one or more substituents on the phenyl group such as hydrogen, an alkyl group such as methyl, ethyl, propyl, butyl or the like, an alkoxy group such as methoxy, ethoxy, propoxy or the like, an aryl group such as the phenyl group, an aralkyl group and particularly a phenyl-alkyl group such as the benzyl group, a phenyl-alkoxy group such as phenylmethoxy and including the phenoxy group, the hydroxy group, polyalkoxy substituents such as dimethoxy and trimethoxy substituents, a lower alkylenedioxy group such as the methylenedioxy group, a halogen such as bromine or chlorine, and dihydroxy substituents, $R_1$ is hydrogen, an alkyl group such as methyl ethyl, isopropyl and the like, cycloalkyl, hydroxyalkyl, or an aralkyl group such as benzyl and phenethyl, and $R_2$ represents hydrogen, an alkyl group and particulary the lower alkyl groups such as methyl, ethyl, propyl, butyl, isopropyl, pentyl, hexyl and the like, a hydroxyalkyl group such as the ethylhydroxy group, an alkenyl group such as a lower alkenyl group and particularly the allyl group and the 1-(2-butenyl) group, an aryl group and particularly a monocyclic aryl group such as the phenyl group and nuclear substituted phenyl groups such as the hydroxyphenyl, methoxyphenyl, chlorophenyl and acetoxyphenyl groups, an aralkyl group and particularly one in which the aryl moiety is monocyclic and the alkyl moiety is a lower alkyl group of at least two carbons in a straight chain such as phenethyl, phenylpropyl and p - chlorophenylpropyl groups, a cycloalkyl group such as the cyclophentyl and cyclohexyl groups, an alkynyl group such as propynyl, butynyl and the like, the 2-thienylmethyl group and the pyridylmethyl group, and Y is a straight or branched alkylene group of at least two carbons between the phenyl and hydrazine groups and advisably of 12 or less carbons although it generally is of 5 or less carbons, such as the following:

(a) $CH(CH_3)CH_2$, 1-methylethylene
(b) $CH_2CH_2CH_2$, propylene
(c) $CH_2CH(CH_3)$, 2-methylethylene
(d) $CH(CH_3)CH_2CH_2$, 1-methylpropylene
(e) $CH_2CH(CH_3)CH_2$, 2-methylpropylene
(f) $CH_2CH_2CH(CH_3)$, 3-methylpropylene
(g) $CH_2CH_2CH(CH_3)CH_2$, 3-methylbutylene The compounds of Formula I are potent monoamine oxidase inhibitors and central nervous system stimulants useful for psychotherapeutic treatment of depressed mental states. Although I do not wish to be restricted to a theory, it is considered that these phenylalkylhydrazines pass through the blood-brain barrier and, because of their monoamine oxidase inhibitory property, retard or prevent the metabolic destruction of neurohumoral agents such as serotonin and norepinephrine. Serotonin and norepinephrine are present in the brain and apparently serve as chemical transmitters in, or stimulants of, the central nervous system. A deficiency of available serotonin or norepinephrine in the brain, such as can be caused by metabolism or degradation of these agents by monoamine oxidase, may result in parasympathetic predominance present in depressed mental states. By preventing or retarding destruction of serotonin and norepinephrine through the use of a phenylalkyldrazine the levels of these neurohumoral agents present in the body are maintained higher for longer periods of time so that sympathetic characteristics such as increased awareness and motility result. These phenylalkylhydrazines also stimulate the heart muscle and are thus useful for the treatment of a person in a state of shock.

Several methods of preparing the compounds of Formula I may be employed. In one method a suitable phenylalkylhalide is reacted with hydrazine or a monosubstituted hydrazine to form the corresponding phenylalkylhydrazine. This process may be represented as follows:

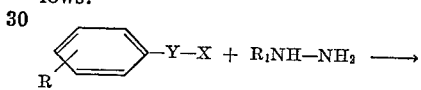

wherein X is a reactive halogen such as chlorine, bromine or iodine, and R, $R_1$ and Y have the significance previously assigned.

In addition to hydrazine hydrate, monosubstituted hydrazines such as methylhydrazine, ethylhydrazine, phenethylhydrazine, phenylhydrazine, propargylhydrazine, allylhydrazine, hydroxyethylhydrazine, p-chlorophenylpropylhydrazine, cyclohexylhydrazine, 2-pyridylmethylhydrazine and the like may be used.

Phenylalkylhalides in which the alkyl moiety is ethyl or larger may be used in the process including phenylethylhalide,
p-chlorophenylisopropylchloride,
4-(p-methoxyphenyl)-2-methyl butylhydrazine,
3,4-methylenedioxyphenylethylchloride,
phenyloctylchloride,
p-phenoxyphenylpropylbromide,
m-methylphenylhexylchloride and the like.

The reaction is effected by adding the phenylalkylhalide very slowly to a solution of a large excess (200%) of the hydrazine reactant in a solvent such as methanol, ethanol, butanol or dioxane. Increased temperatures such as up to reflux temperature are generally employed to increase the reaction rate. By distilling off the solvent, extracting the residue with a solvent such as ether and then fractionally distilling the extract, the desired reaction product may be recovered.

Representative of the products which are produced in this way are beta-phenylethylhydrazine, N-(3-phenyl-2-propyl)hydrazine, N-phenylhexyl - N - methyl hydrazine, N-(p-chlorophenylpropyl) - N - benzyl hydrazine, N-(3,4-methylenedioxyphenylethyl) - N - cyclohexyl hydrazine, N-phenyl ethyl-N-phenyl hydrazine, p-hydroxyphenylbutylhydrazine, N-phenylethyl-N-hydroxyethyl hydrazine and N-phenylpropyl-N-2-pyridylmethyl hydrazine.

The phenylalkylhydrazines may also be produced by the process which comprises reacting hydrazine or an N-substituted hydrazine with a phenylalkylaldehyde or a phenylalkyl-alkylketone to form an intermediate hydrazone which is then reduced to the desired hydrazine. This process may be represented as follows:

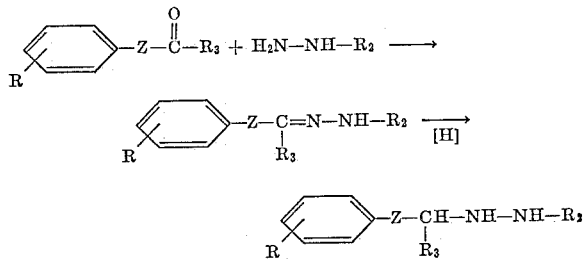

wherein R and $R_2$ have the significance previously assigned, Z is a lower alkylene group, $R_3$ is hydrogen or a lower alkyl group, and

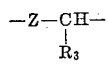

is equivalent to the significance assigned to Y previously.

Some of the phenylalkyl aldehydes and phenylalkyl alkyl ketones which may be used in this process are phenylethylaldehyde,
2-phenylpropionaldehyde,
p-chlorophenylbutyraldehyde,
3,4-methylenedioxyphenylvaleraldehyde,
phenylacetal,
p-hydroxyphenylacetaldehyde,
phenylethyl methyl ketone,
phenylbutyl ethyl ketone,
2-phenylpropyl propyl ketone,
phenylethyl methyl ketone and the like.

In addition to hydrazine, monosubstituted hydrazines such as methylhydrazine, ethylhydrazine, propylhydrazine, phenylethylhydrazine, hydroxyethylhydrazine, p-hydroxyphenylhydrazine, propargylhydrazine, allylhydrazine, cyclohexylhydrazine, cyclohexylethylhydrazine, 2-thienylmethylhydrazine and 3-pyridylmethylhydrazine may be used in the process.

Reaction between the phenylalkyl alkyl ketone or aldehyde and the hydrazine is conveniently effected by contacting the reactants in the presence of water or a lower alcohol. The reaction proceeds at room temperature although slightly elevated temperatures may be employed to increase the rate of reaction. Recovery of the intermediate phenylalkylidenyl hydrazine, or hydrazone, is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazone may be reduced to the corresponding hydrazine by use of a suitable reducing agent. Lithium aluminum hydride is the preferred reducing agent although catalytic hydrogenation also may be employed. With lithium aluminum hydride, the reduction may be conveniently effected by intimately combining the reactants in an inert organic solvent such as anhydrous ether, dioxane, or tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

Some of the hydrazines produced in this way are phenylethylhydrazine,
N-phenylpropyl-N'-ethyl hydrazine,
N-phenylbutyl-N'-cyclohexylhydrazine,
N-phenylhexyl-N'-phenylpropyl hydrazine,
N-3,4-methylenedioxyphenylethyl-N'-propyl hydrazine,
N-phenylethyl-N'-phenyl hydrazine and the like.

Hydrazines of Formula I in which $R_1$ is a lower alkyl or aralkyl group and $R_2$ is hydrogen may be conveniently produced by reacting an N-lower alkyl or aralkyl-N-(phenylalkyl)amine with nitrous acid to form the corresponding N-nitroso-N-lower alkyl or aralkyl-N-(phenylalkyl)amine and reducing such compound to the corresponding hydrazine. This reaction may be represented as follows:

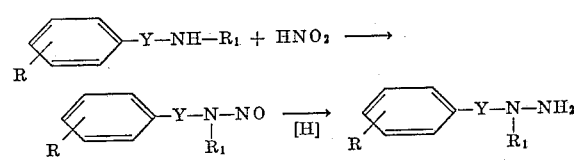

wherein $R_1$ is an alkyl or aralkyl group as previously specified, and Y and R have the significance previously assigned.

Some of the N-lower alkyl or aralkyl-N-(phenylalkyl) amines which may be used in this process are N-methyl phenylisopropyl amine, N-ethyl p-hydroxyphenylisopropylamine, N-propyl 3,4-methylenedioxyphenylisopropylamine, N-benzyl o-methoxyphenylbutylamine, N-phenethyl-N-(3-phenylbutyl)amine and N-propyl-N-(2-phenylamyl)amine.

The nitrosation reaction may be readily effected by contacting the N-lower alkyl or aralkyl-N-(phenylalkyl)amine and nitrous acid under aqueous conditions at room temperature or moderately reduced temperatures. By extracting the reaction mixture with an immiscible solvent followed by evaporation of the solvent the nitroso intermediate may be recovered. It may be purified by fractional distillation.

Reduction of the nitroso compound to the corresponding hydrazine may be conveniently achieved by chemical or catalytic methods such as described hereinabove. Representative compounds formed in this manner are N-amino-N-methyl phenylisopropylamine, N-amino-N-ethyl p-methoxyphenylhexylamine, N-amino-N-benzyl p-hydroxyphenylethylamine, N-amino-N-propyl-3,4-methylenedioxy-phenylisopropylamine, N-amino-N-methyl-N-(2-phenylbutyl)amine and N-amino-N-ethyl-N-(3-phenylamyl)amine.

The described hydrazines are advisably employed in the described uses in the form of nontoxic acid addition salts such as the hydrochloride, hydrobromide, fumarate, phosphate and sulfate.

The phenylalkylhydrazines may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc and the like may be used to form powders. The powders may be used as such for direct administeration to a patient or, instead, the powders may be added to suitable foods and liquids, including water, to facilitate administration.

The powders also may be used to make tablets, or to fill gelatin capsules. Suitable lubricants like magnesium stearate, binders such as gelatin, and disintegrating agents like sodium carbonate in combination with citric acid may be used to form the tablets.

Unite dosage forms such as tablets and capsules may contain any suitable predetermined amount of one or more of the phenylalkylhydrazines, advisably as a nontoxic acid addition salt, and may be administered one or more at a time at regular intervals. Such unit dosage forms, however, should generally contain a concentration of 0.1% to 10% by weight of one or more of the active hydrazines.

A typical tablet may have the composition:

|  | Mg. |
|---|---|
| (1) 2-phenylpropylhydrazine HCl | 10 |
| (2) Starch U.S.P. | 57 |
| (3) Lactose U.S.P. | 73 |
| (4) Talc U.S.P. | 9 |
| (5) Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

|  | Mg. |
|---|---|
| (1) N-methyl-N'-(3-phenyl - 2 - propyl)-hydrazine HCl | 5 |
| (2) Lactise U.S.P. | 200 |
| (3) Starch U.S.P. | 16 |
| (4) Talc U.S.P. | 8 |

The oral route is preferred for administering the active phenylalkylhydrazines.

According to a further embodiment of this invention, one or more of the phenylalkylhydrazines is administered simultaneously with, or concomitantly to, the administration of either tryptophan and/or phenylalanine to an animal or human. Tryptophan passes the blood-brain barrier and is converted in the brain to serotonin. Serotonin is not administered directly since it cannot pass the blood-brain barrier. Similarly, phenylalanine passes the blood-brain barrier and is converted in the brain to norepinephrine. Norepinephrine itself will not pass the blood-brain barrier so it is not given directly. By the administration of an active phenylalkylhydrazine simultaneously with, or concomitantly to, either tryptophan or phenylalanine, the monoamine oxidase inhibitory property of the hydrazine retards or prevents the degradation of serotonin and/or norepinephrine which are produced in the brain from the said amino acids. The serotonin and norepinephrine levels are thus not only raised but are maintained at the increased level by the described treatment.

Any suitable amounts of tryptophan and/or phenylalanine may be administered since these materials are nontoxic. One or both of these materials is advisably combined with one or more of the active phenylalkylhydrazines into suitable pharmaceutical formulations.

The following examples illustrate methods of making the compounds.

EXAMPLE 1

*Beta-phenethylhydrazine*

To a refluxing solution containing 147.5 g. of 85% hydrazine hydrate in 500 cc. of ethanol was added, during a period of 5 hours, 92.5 g. of phenethylbromide (0.50 mole) in 150 cc. of ethanol. Stirring and refluxing were continued for two hours. The ethanol was removed by distillation and the residue extracted repeatedly with ether. The ether was dried with potassium carbonate and the product collected by distillation, B.P. 74° C./0.1 mm., yield 52.3 g. (77%); $N_D^{20}$ 1.5494.

*Analysis.*—Calcd. for $C_8H_{12}N_2$: N, 20.57. Found: N, 20.85.

EXAMPLE 2

*Phenethyl hydrazine hydrochloride*

The salt was prepared in ethanol by the addition of ethereal hydrochloric acid to the base, M.P. 167° C.

*Analysis.*—Calcd. for $C_8H_{13}ClN_2$: Cl, 20.53. Found: Cl, 20.71.

EXAMPLE 3

*2-phenylpropylidenyl hydrazine*

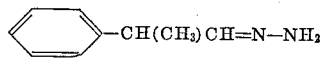

100.5 g. (0.75 mole) of 2-phenylpropionaldehyde was added during a period of 2 hours to 132.5 g. of 85% hydrazine hydrate at room temperature in 500 cc. methanol. After standing at room temperature for two hours, the methanol was removed and water was added to the residue. The aqueous mixture was saturated with potassium hydroxide and extracted with ether. The product was collected by distillation at 83° C./0.08 mm., yield 100 g. (90%); $N_D^{20}$ 1.5610.

*Analysis.*—Calcd. for $C_9H_{12}N_2$: N, 9.45. Found: N, 8.88.

EXAMPLE 4

*1-hydrazino-2-phenylpropane*

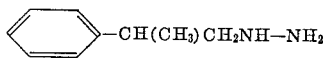

The hydrazone described in Example 3 was reduced by dissolving 59.3 g. (0.40 M) of it in 200 cc. of ethanol, neutralizing the solution with 24 g. of acetic acid and subjecting it to hydrogenation at 60 lbs. p.s.i. of hydrogen in the presence of 0.8 g. of platinum oxide. The product was collected by distillation in vacuo, B.P. 70° C. (0.1 mm.); $N_D^{20}$ 1.5417.

*Analysis.*—Calcd. for $C_9H_{14}N_2$: N, 18.65. Found: N, 17.57.

The diacid phosphate salt was prepared in ethanol, M.P. sinters at 117° C.

*Analysis.*—Calcd. for $C_9H_{17}N_2PO_4$: $PO_4^=$, 39.48. Found: $PO_4^=$, 39.21.

EXAMPLE 5

*N-(3-phenyl-2-propyl)hydrazine*

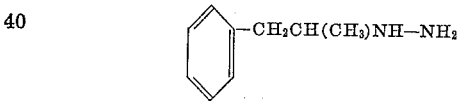

To 106 g. of 85% aqueous $N_2H-H_2O$ (1.8 mole) in 500 cc. of methanol was added 120.8 g. (0.90 mole) of phenylacetone with stirring and cooling, keeping the temperature between 15–20° C. The mixture was stirred for four hours at room temperature. The methanol was removed by distillation and the residue dissolved in 400 cc. of ether. The ether solution was dried with potassium carbonate and the ether removed by distillation. One hundred gms. of the residue was dissolved in 300 cc. of ethanol and hydrogenated in the presence of 40 g. of acetic acid and 1.0 g. of platinum oxide catalyst at a pressure of 60 lbs. $H_2$. The solution was clarified by filtration, the solvent distilled, the residue dissolved in water, the aqueous solution saturated with solid potassium hydroxide and the alkaline mixture extracted repeatedly with ether. The product was collected by distillation at 70° C. (0.02 mm.); $N_D^{20}$ 1.5373; yield 53 g. (46%).

*Analysis.*—Calcd. for $C_9H_{14}N_2$: N, 18.66. Found: N, 18.54.

EXAMPLE 6

*N-(3-phenyl-2-propyl)-hydrazine hydrochloride*

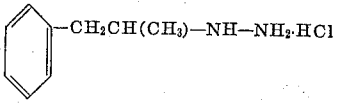

The base of Example 5 was neutralized with ethereal hydrochloric acid in 1:1 ether-isopropyl alcohol solution and the precipitate collected by filtration: M.P. 115–116° C.

*Analysis.*—Calcd. for $C_9H_{15}ClN_2$: Cl, 19.03. Found: Cl, 19.00.

EXAMPLE 7

N-methyl-N'-(3-phenyl-2-propylidenyl)-hydrazine

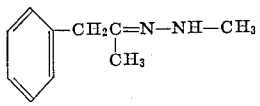

To 48 g. of mono-methylhydrazine sulfate in 325 cc. of water was added 40.1 g. of 28% ammonium hydroxide and then 40.2 g. of methyl benzylketone in 300 cc. of methanol keeping the temperature at 30–35° C. The pH of the reaction mixture was adjusted to 6 with acetic acid. Methanol was then removed by distillation, the residue dissolved in water, the aqueous solution saturated with solid potassium hydroxide, the alkaline mixture extracted with ether and the extracts dried with potassium carbonate. The product was collected at 83° C. (1.0 mm.); yield 21 g. (43%); $N_D^{20}$ 1.5442.

*Analysis.*—Calcd. for $C_{10}H_{14}N_2$: N, 17.26. Found: N, 16.98.

EXAMPLE 8

N-methyl-N'-(3-phenyl-2-propyl)-hydrazine and its hydrochloride

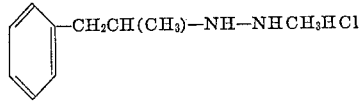

A mixture containing 20.5 g. of the propylidene derivative of Example 7, 7.5 g. of glacial acetic acid, 75 cc. of ethanol and 0.3 g. of platinum oxide catalyst was subjected to hydrogenation at 60 lbs. p.s.i. and room temperature. The catalyst was removed by filtration, the solvent distilled off and the residue dissolved in water. A saturated aqueous potassium hydroxide solution was added to the residue and the mixture extracted with ether. The ether extracts were dried with potassium carbonate and the product collected by distillation; B.P. 78° C. (1 mm.); yield 14.9 g. (71%); $N_D^{20}$ 1.5205.

*Analysis.*—Calcd. for $C_{10}H_{16}N_2$: N, 17.06. Found: N, 16.86.

To 18 g. of the base dissolved in an ether-isopropyl alcohol solution (8:3) was added ethereal hydrochloric acid. The precipitate was collected by filtration, yield 1.6 g., M.P. 115–117° C.

*Analysis.*—Calcd. for $C_{10}H_{17}ClN_2$: Cl, 17.66. Found: Cl, 17.99.

EXAMPLE 9

N-nitroso-N-(3-phenyl-2-propyl)-methylamine

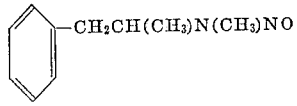

To 92.8 g. (0.44 mole) of N-methyl phenylisopropylamine hydrochloride in 100 cc. of water and 26 cc. (0.54 mole) of conc. hydrochloric acid cooled to 5–10° C. was added slowly a solution of 85 g. (1.2 mole) of sodium nitrite in 150 cc. of water, so as to maintain the reaction at 5–10° C. After extraction of the reaction mixture with ether and removal of the solvent the product was fractionated, B.P. 115–116° C. (0.8 mm.), yield 77.3 g. (87%).

EXAMPLE 10

N-amino-N-methyl phenylisopropylamine

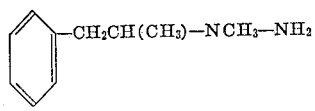

To 10.6 g. (0.28 mole) of lithium aluminum hydride in 500 cc. of anhydrous ether was added 35.7 g. (0.20 mole) of the nitroso compound of Example 9. The mixture was refluxed for 6 hours and the complex decomposed by the addition of 82 cc. of 40% potassium hydroxide. The ether layer was decanted and the solids washed repeatedly with ether. The ethereal extracts and washings were dried with potassium carbonate and the product collected by fractional distillation; B.P. 68–71° C. (0.45–0.60 mm.), yield 27.2 g. (83%).

*Analysis.*—Calcd. for $C_{10}H_{16}N_2$: N, 8.53. Found: N, 8.35.

EXAMPLE 11

3,4-methylenedioxyphenylisopropylhydrazine

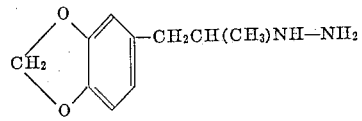

To 29.5 g. (0.50 mole) of 85% hydrazine hydrate in 150 cc. of methanol was added, during one hour at 5–10° C., 44.5 g. (0.25 mole) of 3,4-methylenedioxyphenylacetone. The solution was stirred for 2.5 hours. The methanol was removed by distillation. To the residue was added 150 cc. of absolute ethyl alcohol and 500 mg. of platinum oxide and the mixture subjected to hydrogenation at 60 lbs. of hydrogen and room temperature. The catalyst was removed by filtration and the product recovered by fractional distillation, yield 31.9 g. (66%); B.P. 130° C./0.6 mm.

*Analysis.*—Calcd. for $C_{10}H_{14}N_2O_2$: N, 7.22. Found: N, 6.84.

EXAMPLE 12

Sym.-bis-N,N'-(phenylisopropyl)-hydrazine

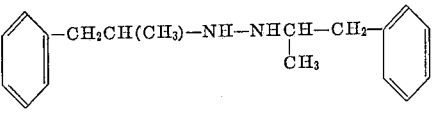

To 106 g. (1.8 mole) of 85% hydrazine hydrate in 500 cc. of methanol was added 120.6 g. of phenylacetone with stirring. The solution was stirred for 1 hour at room temperature and then refluxed for 15 minutes. The methanol was removed by distillation and the residue extracted with ether. The ether was removed by distillation, the residue dissolved in 150 cc. of ethanol and subjected to hydrogenation in the presence of 600 mg. $PtO_2$ at 60 lbs. of hydrogen and at room temperature. After removal of the catalyst by filtration the product was collected at 140° C. (0.02 mm.); yield 43.0 g (35.6%).

*Analysis.*—Calcd. for $C_{18}H_{24}N_2$: Titratable N, 5.22. Found: Titratable N, 5.26.

Various changes and modifications of the invention can be made and, to the extent that such variations incorporate the spirit of this invention, they are intended to be included within the scope of the appended claims.

What is claimed is:

1. A compound of the formula

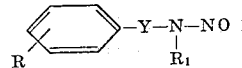

wherein R represents hydrogen, lower alkyl, lower alkoxy, chloro, bromo, methylenedioxy or phenoxy, $R_1$ represents hydrogen or lower alkyl, and Y is a straight or branched alkylene of 2 to 5 carbons but Y is a branched alkylene when R is hydrogen.

2. N-nitroso-N-(3-phenyl-2-propyl)-methylamine.

References Cited

UNITED STATES PATENTS

| | | | |
|---|---|---|---|
| 2,383,134 | 8/1945 | Lacey et al. | 260—569 |
| 2,430,721 | 11/1947 | Ladd | 260—570.8 |
| 2,688,040 | 8/1954 | Adams et al. | 260—569 |
| 2,784,141 | 3/1957 | Jacobsen | 167—65 |
| 2,804,422 | 8/1957 | Schumann | 167—65 |
| 3,062,887 | 11/1962 | Levering et al. | 260—570.8 X |

(Other references on following page)

OTHER REFERENCES

Grammaticakis: Comptes Rendu, vol. 204: pp. 1262, 1263 (1937).

Jones et al.: Journal of the Chemical Society (London) (1930), p. 927.

Musante Gazzetta Chimica Italiana, vol. 67, p. 586 (1937).

Neber et al.: Deutsche Chemische Gesellschaft (Berichte), vol. 58–B: p. 1245 (1925).

Sah: Chemical Abstracts, vol. 43, pp 6.972, 6973 (1949).

Votocek et al.: Chemical Abstracts, vol. 30, p. 8172 (1936).

Votocek et al.: Chemical Abstracts, vol. 26, p. 5294 (1932).

Wagener et al.: Synthetic Organic Chemistry, p. 741 (1953).

CHARLES B. PARKER, *Primary Examiner.*

M. O. WOLK, I. MARCUS, W. B. KNIGHT, *Examiners.*

T. LEFCO, J. W. MOLASKY, J. S. SAXE, R. V. HINES,
*Assistant Examiners.*